US008620988B2

(12) United States Patent
Sohm et al.

(10) Patent No.: US 8,620,988 B2
(45) Date of Patent: Dec. 31, 2013

(54) SYSTEM AND METHOD FOR PROCESSING SYNDICATION INFORMATION FOR A MOBILE DEVICE

(75) Inventors: Mark Sohm, Guelph (CA); Jennifer Emery, Ayr (CA); Michael Clewley, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 1034 days.

(21) Appl. No.: 11/086,373

(22) Filed: Mar. 23, 2005

(65) Prior Publication Data
US 2006/0217126 A1  Sep. 28, 2006

(51) Int. Cl.
*G06F 15/16* (2006.01)
*H04L 29/08* (2006.01)

(52) U.S. Cl.
CPC ... *H04L 29/08072* (2013.01); *Y10S 707/99933* (2013.01); *Y10S 707/9994* (2013.01)
USPC ........... 709/201; 709/203; 709/204; 709/206; 709/217; 709/218; 709/219; 709/223; 709/224; 709/225; 709/227; 709/229; 709/230; 709/231; 709/238; 709/202; 725/45; 725/46; 725/47; 725/48; 725/50; 725/53; 725/56; 725/105; 370/330; 370/337; 370/341; 370/347; 370/348; 370/241; 370/478; 370/328; 455/31.1; 455/31.2; 455/31.3; 455/403; 455/54.1; 455/412.1; 455/454; 707/104.1; 707/999.003; 707/999.01; 707/E17.108; 707/E17.111

(58) Field of Classification Search
USPC ......... 709/206, 201, 203, 204, 217, 218, 219, 709/230, 231, 238, 202, 223, 224, 225, 227, 709/229; 725/105, 45, 46, 47, 48, 50, 53, 725/56; 370/330, 478, 337, 341, 347, 348, 370/241, 328; 455/31.1, 31.2, 31.3, 403, 455/54.1, 454, 412, 412.1; 403/325; 715/501.1, 733, 738, 740, 764–765, 715/744–749; 340/825.44, 825.47; 707/3, 707/10, 104.1, 999.003, 999.01, E17.108, 707/E17.111
See application file for complete search history.

(56) References Cited

U.S. PATENT DOCUMENTS 6,185,553 B1 * 2/2001 Byrd et al. .................. 707/3
6,311,194 B1 * 10/2001 Sheth et al. .................. 715/236
(Continued)

FOREIGN PATENT DOCUMENTS

| CA | 2520089 C | 11/2011 |
| EP | 1043905 | 10/2000 |

(Continued)

OTHER PUBLICATIONS

Research in Motion Limited, BlackBerry Java Development Environment Version 4.0, BlackBerry Application Development Guide, vol. 1: Fundamentals, Nov. 26, 2004, Waterloo, Canada.

(Continued)

*Primary Examiner* — Saket K Daftuar
(74) *Attorney, Agent, or Firm* — Bereskin & Parr LLP/S.E.N.C.R.L., s.r.l.

(57) ABSTRACT

A system and method for processing syndication information for a mobile device that includes: identifying a plurality of syndication servers to which a user of the mobile device subscribes; polling, at a first predetermined interval, the plurality of syndication servers to determine if syndication information on each the syndication server has been updated; if the syndication information has been updated, requesting and receiving updated syndication information; adapting the updated syndication information into a predetermined format, and sending the adapted syndication information to the mobile device. The sending of the adapted syndication information may also be performed at a predetermined interval. The predetermined format preferably uses less data and requires less processing than the original format.

6 Claims, 7 Drawing Sheets

(56) References Cited

U.S. PATENT DOCUMENTS

| | | | |
|---|---|---|---|
| 6,363,419 B1 | 3/2002 | Martin, Jr. et al. | |
| 6,381,465 B1 | 4/2002 | Chern et al. | |
| 6,401,075 B1* | 6/2002 | Mason et al. | 705/14.72 |
| 6,421,675 B1* | 7/2002 | Ryan et al. | 707/100 |
| 6,442,577 B1* | 8/2002 | Britton et al. | 715/230 |
| 6,487,538 B1 | 11/2002 | Gupta et al. | |
| 6,519,241 B1* | 2/2003 | Theimer | 370/338 |
| 6,640,098 B1 | 10/2003 | Roundtree | |
| 6,662,195 B1* | 12/2003 | Langseth et al. | 1/1 |
| 6,668,177 B2 | 12/2003 | Salmimaa et al. | |
| 6,698,020 B1* | 2/2004 | Zigmond et al. | 725/34 |
| 6,711,474 B1 | 3/2004 | Treyz et al. | |
| 6,728,628 B2 | 4/2004 | Peterson | |
| 6,736,727 B1 | 5/2004 | Doi et al. | |
| 6,738,808 B1 | 5/2004 | Zellner et al. | |
| 6,750,883 B1 | 6/2004 | Parupudi et al. | |
| 6,779,154 B1* | 8/2004 | Nussbaum et al. | 715/234 |
| 6,798,358 B2 | 9/2004 | Joyce et al. | |
| 6,807,558 B1 | 10/2004 | Hassett et al. | |
| 6,826,614 B1* | 11/2004 | Hanmann et al. | 709/227 |
| 6,829,475 B1 | 12/2004 | Lee et al. | |
| 6,848,542 B2 | 2/2005 | Gailey et al. | |
| 6,879,838 B2 | 4/2005 | Rankin et al. | |
| 6,909,903 B2 | 6/2005 | Wang | |
| 6,915,328 B2* | 7/2005 | Turnbull | 709/203 |
| 6,938,077 B2 | 8/2005 | Sanders | |
| 6,956,847 B2 | 10/2005 | Heston et al. | |
| 7,076,244 B2 | 7/2006 | Lazaridis | |
| 7,136,875 B2* | 11/2006 | Anderson et al. | 707/104.1 |
| 7,177,859 B2* | 2/2007 | Pather et al. | 1/1 |
| 7,225,249 B1* | 5/2007 | Barry et al. | 709/227 |
| 7,248,861 B2 | 7/2007 | Lazaridis | |
| 7,275,089 B1* | 9/2007 | Marshall et al. | 709/219 |
| 7,350,215 B2* | 3/2008 | Shenfield et al. | 719/319 |
| 7,389,526 B1* | 6/2008 | Chang et al. | 725/105 |
| 7,711,769 B2 | 5/2010 | Lazaridis et al. | |
| 7,853,674 B2* | 12/2010 | Shenfield et al. | 709/221 |
| 7,949,726 B2* | 5/2011 | Freeberg et al. | 709/218 |
| 8,296,351 B2 | 10/2012 | Lazaridis et al. | |
| 2001/0056460 A1* | 12/2001 | Sahota et al. | 709/201 |
| 2002/0046084 A1 | 4/2002 | Steele et al. | |
| 2002/0065785 A1* | 5/2002 | Tsuda | 705/67 |
| 2002/0069105 A1* | 6/2002 | do Rosario Botelho et al. | 705/14 |
| 2002/0078382 A1* | 6/2002 | Sheikh et al. | 713/201 |
| 2002/0092019 A1* | 7/2002 | Marcus | 725/37 |
| 2002/0133504 A1* | 9/2002 | Vlahos et al. | 707/104.1 |
| 2002/0133626 A1* | 9/2002 | Turnbull | 709/246 |
| 2002/0143819 A1* | 10/2002 | Han et al. | 707/513 |
| 2002/0188527 A1 | 12/2002 | Dillard et al. | |
| 2002/0198866 A1* | 12/2002 | Kraft et al. | 707/3 |
| 2003/0055881 A1* | 3/2003 | Ngo | 709/203 |
| 2003/0092455 A1* | 5/2003 | Natsuno | 455/466 |
| 2004/0002958 A1* | 1/2004 | Seshadri et al. | 707/3 |
| 2004/0002972 A1* | 1/2004 | Pather et al. | 707/6 |
| 2004/0002988 A1* | 1/2004 | Seshadri et al. | 707/102 |
| 2004/0229595 A1* | 11/2004 | Laursen et al. | 455/403 |
| 2005/0108634 A1* | 5/2005 | Sahota et al. | 715/513 |
| 2005/0108637 A1* | 5/2005 | Sahota et al. | 715/526 |
| 2005/0114757 A1* | 5/2005 | Sahota et al. | 715/501.1 |
| 2005/0165615 A1* | 7/2005 | Minar | 705/1 |
| 2005/0165743 A1* | 7/2005 | Bharat et al. | 707/3 |
| 2005/0165774 A1* | 7/2005 | Andrus et al. | 707/3 |
| 2005/0188056 A1* | 8/2005 | Kangas et al. | 709/218 |
| 2005/0188403 A1* | 8/2005 | Kotzin | 725/47 |
| 2006/0026067 A1* | 2/2006 | Nicholas et al. | 705/14 |
| 2006/0143664 A1* | 6/2006 | Hartselle et al. | 725/88 |
| 2006/0167829 A1* | 7/2006 | Dreyfus et al. | 707/1 |
| 2006/0168355 A1* | 7/2006 | Shenfield et al. | 709/250 |
| 2006/0200546 A9* | 9/2006 | Bailey et al. | 709/224 |
| 2006/0230021 A1* | 10/2006 | Diab et al. | 707/3 |
| 2006/0235885 A1* | 10/2006 | Steele et al. | 707/104.1 |
| 2007/0143669 A1* | 6/2007 | Royer | 715/523 |
| 2008/0126476 A1* | 5/2008 | Nicholas et al. | 709/203 |
| 2008/0279215 A9* | 11/2008 | Wendling et al. | 370/465 |
| 2009/0031300 A1* | 1/2009 | Vau et al. | 717/178 |
| 2010/0174756 A1 | 7/2010 | Lazaridis et al. | |
| 2013/0006774 A1 | 1/2013 | Lazaridis et al. | |

FOREIGN PATENT DOCUMENTS

| | | |
|---|---|---|
| WO | 00/43913 | 7/2000 |
| WO | 01/27790 | 4/2001 |

OTHER PUBLICATIONS

Computer Security News, Secure Wireless Aggregation, ITsecurity.com, Apr. 8, 2004, http://www.itsecurity.com/papers/daswani1.htm.

Feedburner, The FeedBurner Mobile Feed Reader 2.0, undated printed Jan. 24, 2005, http://www.feedburner.com/fb/a/mfr.

Geekzone, FeedBurner RSS Feedreader for RIM Blackberry, www.geekzone.co.nz, Dec. 30, 2004, http://www.geekzone.co.nz/content.asp?contentld=3853.

C-pending U.S. Appl. No. 11/763,595, "System and Method for Pushing Information to a Mobile Device", filed Jun. 15, 2007.

Office Action. Co-pending U.S. Appl. No. 11/763,595. Dated: Jun. 25, 2009.

Canadian First Office Action. Patent Application No. 2,520,089. Dated: Jul. 30, 2009.

Request for Continued Examination (RCE). Co-pending U.S. Appl. No. 11/763,595. Dated: Feb. 18, 2010.

Notice of Allowance and Fee(s) Due. Co-pending U.S. Appl. No. 11/763,595. Dated: Jan. 29, 2010.

Amendment. Co-pending U.S. Appl. No. 11/763,595. Dated: Sep. 23, 2009.

Notice of Allowance. Co-pending U.S. Appl. No. 11/763,595. Dated: Mar. 9, 2010.

Co-pending U.S. Appl. No. 12/726,405, "System and Method for Pushing Information to a Mobile Device", filed Mar. 18, 2010.

Canadian Office Action. Application No. 2,520,089. Dated: Oct. 12, 2010.

Notice of Allowance. Canadian Application No. 2,520,089. Dated: Mar. 14, 2011.

Office Action. Co-pending U.S. Appl. No. 12/726,405. Dated: Apr. 13, 2012.

Co-pending U.S. Appl. No. 13/614,884, "System and Method for Pushing Information to a Mobile Device", filed Sep. 13, 2012.

Office Action. Co-pending U.S. Appl. No. 13/614,884. Dated: Nov. 27, 2012.

Amendment. Co-pending U.S. Appl. No. 13/614,884. Dated: Feb. 26, 2013.

\* cited by examiner

SYSTEM AND METHOD FOR PROCESSING SYNDICATION INFORMATION FOR A MOBILE DEVICE

FIELD OF THE INVENTION

The invention relates generally to a system and method for processing syndication information for a mobile device, and more specifically to a system and method for retrieving, parsing and pushing XML syndication information to a mobile device.

BACKGROUND OF THE INVENTION

A popular use of the Internet is to review news articles, weblogs, or the like (generally referred to herein as "news articles") on web sites. Recently, more and more web sites are using syndication services such as Really Simple Syndication (RSS) or Resource Description Framework (RDF) services to provide syndication information. Syndication information may include information such as titles or headlines, descriptions, and the like, regarding the news articles available on the web sites. The syndication services allow appropriate reader software to connect to a web site and retrieve syndication information (for example, typically a list of headlines and descriptions) that can be presented to the user. The RSS and RDF syndication services make use of the XML specification, which provides a framework for creating meta-tags in a data element/file. More information on RSS and RDF can be found on their official home pages, http://blogs.law.harvard.edu/tech/rss and http://www.w3.org/RDF, respectively.

Since a user may want to review information from a number of web sites, it can be time consuming to check each of the web sites to determine if the information has been updated. Current solutions for receiving syndication information on a mobile device are typically inefficient because the mobile device or user of the mobile device is required to poll multiple web sites to check if the content has changed. If the content has changed it is then requested and downloaded by the mobile device. This polling of web sites results in unnecessary wireless traffic, which reduces mobile device performance and battery life as well as incurring a strain on the wireless network.

Further, XML documents such as the syndication formats RSS and RDF contain data that is not required by or viewed by the user. Still further, syndication formats typically do not give the user the option to customize the size of the data set sent (such as number of articles, description size). This can result in a large (by wireless standards) download requirement, which is then multiplied by the number of syndication services the user wishes to view. This also results in additional wireless traffic, which reduces mobile device performance and battery life as well as incurring a strain on the wireless network.

Upon receiving an XML document, the mobile device is then required to parse (i.e. interpret) the XML document using reader software for each syndication service and present the required information to the user in a user friendly fashion. This can be particularly difficult if the user wishes to view syndication information that originate in different formats and may require different reader software. This results in a computation burden on the mobile device, which reduces mobile device performance and battery life.

As such, there is a need for an improved system and method for processing syndication information for a mobile device and for delivering the syndication information to the mobile device.

SUMMARY OF THE INVENTION

Embodiments of the invention are generally directed to a system and method for retrieving, parsing and pushing syndication information to a mobile device. In particular, the system and method involve a news aggregation server and service that independently polls syndication servers for updates, retrieves updates, handles the parsing of all syndication documents, and then pushes updates to the mobile device only when necessary. The news aggregation server and service also allows users to customize the data they wish to receive on their mobile device.

Thus, the news aggregation service overcomes at least some of the above problems by:
1. Reducing Bandwidth—reducing the amount of polling of syndication servers by the mobile device and reducing the volume of data in the syndication information.
2. Reducing Processing—reducing the processing required at the mobile device by parsing the syndication information into a lower data volume format that can be readily processed by the mobile device.

The reduction in bandwidth and processing required results in improved battery life and performance of the mobile device.

In one broad aspect of the invention, there is provided a method of processing syndication information for a mobile device that includes: identifying a plurality of syndication servers to which a user of the mobile device subscribes, polling, at a first predetermined interval, the plurality of syndication servers to determine if syndication information on each the syndication server has been updated, if the syndication information has been updated, requesting and receiving updated syndication information, adapting the updated syndication information into a predetermined format, and sending the adapted syndication information to the mobile device.

In a particular case, the first predetermined interval is set according to requirements of the user of the mobile device.

In another particular case, the first predetermined interval is set by a system administrator and the sending the adapted syndication information is performed at a second predetermined interval, which is set according to requirements of the user of the mobile device.

In yet another particular case, the syndication server is an XML syndication server and the adapting comprises parsing XML syndication information into a format that uses a smaller amount of data or that requires less processor capability to display on a mobile device.

In yet another particular case, the adapting comprises selecting a portion of the syndication information and formatting the portion in a format that uses a smaller amount of data or that requires less processor capability to display on a mobile device. In this case, the portion may include a syndication information title and a syndication information description.

In still yet another particular case, the predetermined format is HTML format.

In still yet another particular case, the adapting comprises combining syndication information from the plurality of syndication servers.

In still yet another particular case, wherein the predetermined format comprises a format having one or more aspects specified by the user.

In still yet another particular case, the method further includes: determining if the adapted syndication information has been updated since previously sent to the user and only sending to the user if the syndication information has been updated.

According to another broad aspect of the invention, there is provided a software application comprising a plurality of instructions stored on a computer-readable medium, the instructions for a method of processing syndication information for a mobile device as claimed in claim 1.

According to yet another broad aspect of the invention, there is provided a system for processing syndication information for a mobile device comprising at least one computing device, wherein a software application executes and resides on a memory of the at least one computing device, wherein the software application is programmed to perform the steps of the method as claimed in claim 1.

BRIEF DESCRIPTION OF THE DRAWINGS

For a better understanding of embodiments of the invention, and to show more clearly how they may be carried into effect, reference will now be made, by way of example, to the accompanying drawings in which.

DETAILED DESCRIPTION OF EMBODIMENTS OF THE INVENTION

This detailed description begins with a general description of the mobile environment and then proceeds to describe the application of embodiments of the invention within this environment.

The mobile environment involves use of a mobile station. A mobile station is a two-way communication device with advanced data communication capabilities having the capability to communicate with other computer systems, and is also referred to herein generally as a mobile device. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 1:
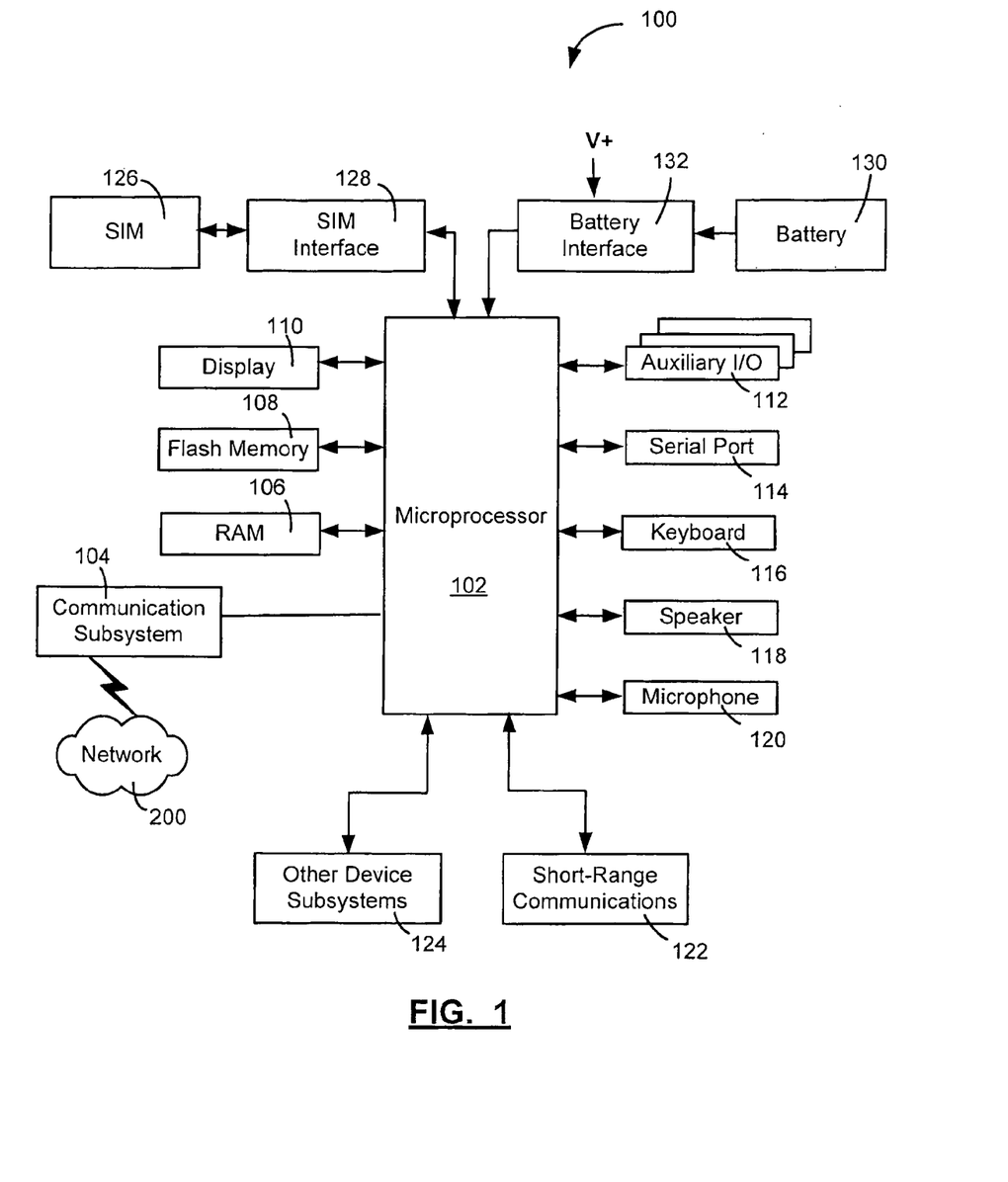
FIG. 1 is a block diagram of a mobile device in one example implementation.
Figure 2:
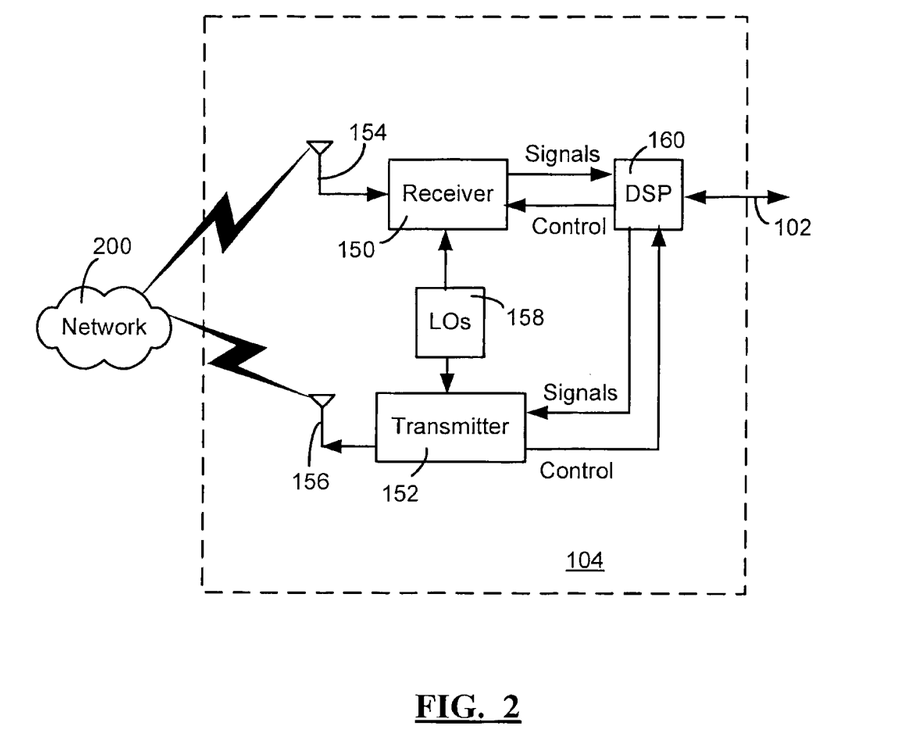
FIG. 2 is a block diagram of a communication subsystem component of the mobile device of FIG. 1.
Figure 3:
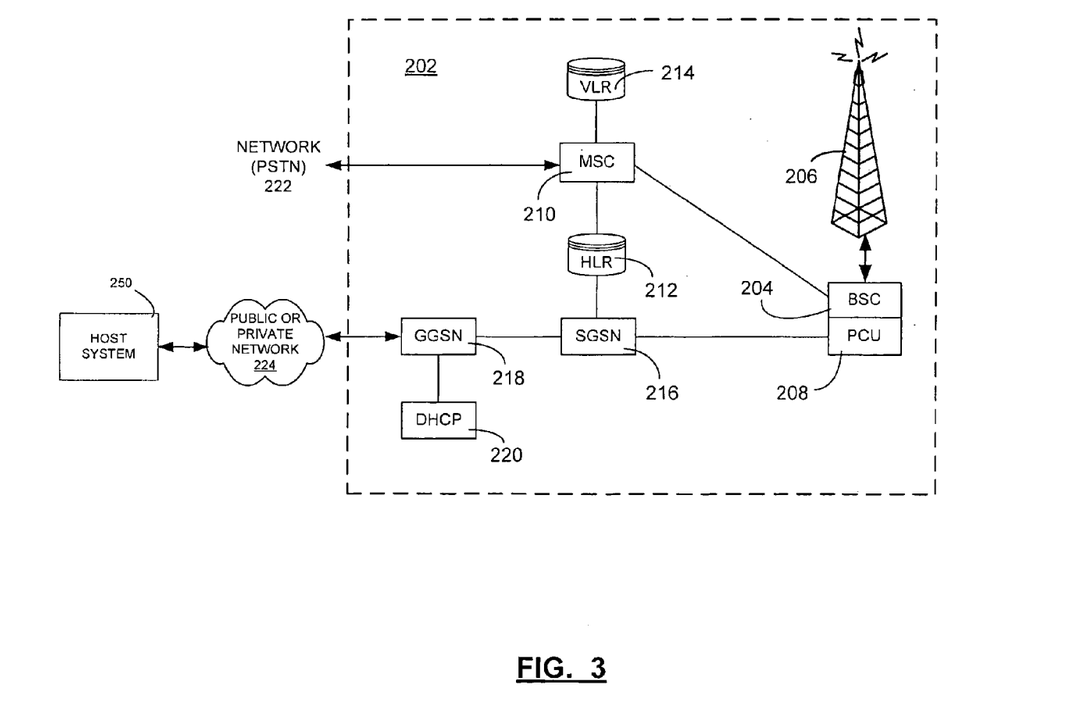
FIG. 3 is a block diagram of a node of a wireless network in one example implementation.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the invention is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 may require a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services could include: web browsing and messaging such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication, subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Figure 4:
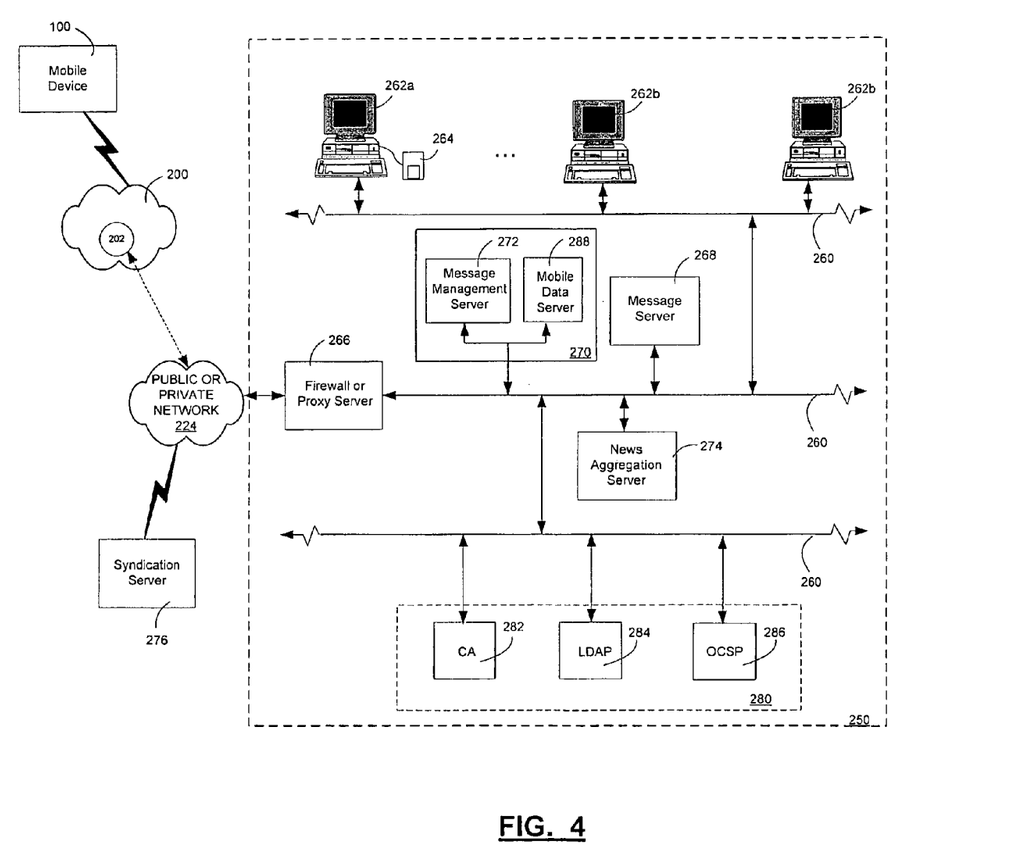
FIG. 4 is a block diagram illustrating components of a host system in one example implementation.

Referring now to FIG. 4, a block diagram illustrating components of a host system in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

LAN 250 comprises a number of network components connected to each other by LAN connections 260. For instance, a user's desktop computer 262a with an accompanying cradle 264 for the user's mobile device 100 is situated on LAN 250. Cradle 264 for mobile device 100 may be coupled to computer 262a by a serial or a Universal Serial Bus (USB) connection, for example. Other user computers 262b are also situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262a to mobile device 100, and may be particularly useful for bulk information updates often performed in initializing mobile device 100 for use. The information downloaded to mobile device 100 may include certificates used in the exchange of messages. It will be understood by persons skilled in the art that user computers 262a, 262b will typically be also connected to other peripheral devices not explicitly shown in FIG. 4.

Furthermore, only a subset of network components of LAN 250 are shown in FIG. 4 for ease of exposition, and it will be understood by persons skilled in the art that LAN 250 will generally comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router is new in the wireless industry and implies that a VPN connection can be established directly through a specific wireless network to mobile device 100. The possibility of using a wireless VPN router has only recently been available and could be used when Internet Protocol (IP) Version 6 (IPV6) arrives into IP-based wireless networks. This new protocol will provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection would preferably be a Transmission Control Protocol (TCP)/IP or User Datagram Protocol (UDP)/IP connection to deliver the messages directly to mobile device 100 in this variant implementation.

Messages intended for a user of mobile device 100 are initially received by a message server 268 of LAN 250. Such messages may originate from any of a number of sources. For instance, a message may have been sent by a sender from a computer 262b within LAN 250, from a different mobile device [not shown] connected to wireless network 200 or to a different wireless network, or from a different computing device or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. One example of a message server 268 is a Microsoft Exchange™ Server. In some implementations, LAN 250 may comprise multiple message servers 268. Message server 268 may also be adapted to provide additional functions beyond message management, including the management of data associated with calendars and task lists, for example.

When messages are received by message server 268, they are typically stored in a message store [not explicitly shown], from which messages can be subsequently retrieved and delivered to users. For instance, an e-mail client application operating on a user's computer 262a may request the e-mail messages associated with that user's account stored on message server 268. These messages would then typically be retrieved from message server 268 and stored locally on computer 262a.

When operating mobile device 100, the user may wish to have e-mail messages retrieved for delivery to the handheld. An e-mail client application operating on mobile device 100 may also request messages associated with the user's account from message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, mobile device 100 is assigned its own e-mail address, and messages addressed specifically to mobile device 100 are automatically redirected to mobile device 100 as they are received by message server 268.

To facilitate the wireless communication of messages and message-related data between mobile device 100 and components of LAN 250, a number of wireless communications support components 270 may be provided. In this example implementation, wireless communications support components 270 comprise a message management server 272, for example. Message management server 272 is used to specifically provide support for the management of messages, such as e-mail messages, that are to be handled by mobile devices. Generally, while messages are still stored on message server 268, message management server 272 can be used to control when, if, and how messages should be sent to mobile device 100. Message management server 272 also facilitates the handling of messages composed on mobile device 100, which are sent to message server 268 for subsequent delivery.

For example, message management server 272 may: monitor the user's "mailbox" (e.g. the message store associated with the user's account on message server 268) for new e-mail messages; apply user-definable filters to new messages to determine if and how the messages will be relayed to the user's mobile device 100; compress and encrypt new messages (e.g. using an encryption technique such as Data Encryption Standard (DES), Triple DES or Advanced Encryption Standard (AES)) and push them to mobile device 100 via the shared network infrastructure 224 and wireless network 200; and receive messages composed on mobile device 100 (e.g. encrypted using Triple DES), decrypt and decompress the composed messages, re-format the composed messages if desired so that they will appear to have originated from the user's computer 262a, and re-route the composed messages to message server 268 for delivery.

Certain properties or restrictions associated with messages that are to be sent from and/or received by mobile device 100 can be defined (e.g. by an administrator in accordance with IT policy) and enforced by message management server 272. These may include whether mobile device 100 may receive encrypted and/or signed messages, minimum encryption key sizes, whether outgoing messages must be encrypted and/or signed, and whether copies of all secure messages sent from mobile device 100 are to be sent to a pre-defined copy address, for example.

Message management server 272 may also be adapted to provide other control functions, such as only pushing certain message information or pre-defined portions (e.g. "blocks") of a message stored on message server 268 to mobile device 100. For example, when a message is initially retrieved by mobile device 100 from message server 268, message management server 272 is adapted to push only the first part of a message to mobile device 100, with the part being of a pre-defined size (e.g. 2 KB). The user can then request more of the message, to be delivered in similar-sized blocks by message management server 272 to mobile device 100, possibly up to a maximum pre-defined message size.

Accordingly, message management server 272 facilitates better control over the type of data and the amount of data that is communicated to mobile device 100, and can help to minimize potential waste of bandwidth or other resources.

It will be understood by persons skilled in the art that message management server 272 need not be implemented on a separate physical server in LAN 250 or other network. For example, some or all of the functions associated with message management server 272 may be integrated with message server 268, or some other server in LAN 250. Furthermore, LAN 250 may comprise multiple message management servers 272, particularly in variant implementations where a large number of mobile devices needs to be supported.

While the message management server 272 handles message related traffic, a mobile content server 274 handles other forms of data traffic such as TCP/IP traffic, which may be, for example, HTML, WAP, SMS, IM (instant message) traffic and the like, that may travel between the mobile device and web servers on the LAN 250 or on the public or private networks 224. The mobile content server 274 provides an application, called a mobile data service, that is used to specifically provide support for the management of data, such as web traffic, that is to be accessed by mobile devices. The terms "mobile content server" and "mobile data service" may sometimes be used interchangeably to represent the functions provided by the combination of the mobile content server 274 and the mobile data service which operates on the mobile content server 274.

The mobile content server 274 enables access to web sites as well as enterprise applications and information using a mobile device equipped with a web browser. The mobile content server 274 includes, for example:

standard HTTP/HTTPS connectivity
XML language support
HTTP data push support
security features.

Of particular note is the support that the mobile content server 274 provides for push applications that allow data/content to be sent from the mobile content server 274 to a mobile device without being prompted by a user of the mobile device.

As is noted above with regard to the message management server 272, the mobile content server 274 may also provide encryption for the data processed by the mobile content server 274.

In an embodiment of the invention, the mobile data server 274 works together with a news aggregation server 276 to allow the push of syndication information to the mobile device. The news aggregation server 276 may be an element in LAN 250 as shown in FIG. 4 or may reside on another computer connected to a private or public network.

The news aggregation server 276 includes a news aggregation service. Generally speaking, the news aggregation service is a software program that runs on the news aggregation server 276. Alternatively, the news aggregation service may run on any desktop PC with an Internet connection, which will then operate as the news aggregation server 276. The terms "news aggregation server" and "news aggregation service" may sometimes be used interchangeably herein.

In operation, the news aggregation server 276 communicates with one or more syndication servers (such as syndication server 278, which is connected to a public or private network 224) to gather syndication information and prepare it for distribution to the mobile device 100 via the mobile content server 274.

The news aggregation service generally includes a list of syndication services (operating on syndication servers). Again, the terms "syndication server" and "syndication service" may sometimes be used interchangeably herein. Subscribers to the news aggregation service are able to subscribe to any syndication service listed on the news aggregation service and have the opportunity to add additional syndication services to the list that may then be available to all users.

Preferably, subscribers have the option to customize the syndication information that is received at the mobile device to suit their needs. For example, subscribers can specify various aspects of the syndication information and the way they appear on the mobile device, including elements such as choosing the order of the syndication services shown on their mobile device, the maximum number of news articles from each syndication service shown/delivered to their mobile device and whether they wish to receive just the article title or article title and description (when available) for each syndication service. This customization is typically done at the time the user joins or subscribes to the news aggregation service and can later be updated.

The news aggregation service is configured to periodically poll the list of syndication services (such as RSS or RDF feeds) to check for changes or updates to syndication information on the syndication servers. This periodic polling occurs at an interval that is typically set by an administrator of the news aggregation service. If syndication information from a syndication server has changed or been updated since the last poll, the syndication information is retrieved and is stored/updated on the news aggregation server 276.

Based on the subscriber information, the news aggregation service determines if any syndication services the subscriber has subscribed to have been updated. If they have, the news aggregation service parses the subscriber information for each subscribed syndication service, creating a custom, compact mobile syndication document optimized for wireless delivery, which is stored locally on the news aggregation server 276.

The news aggregation service is configured to push an updated document to its subscribers every X minutes (where X may be defined by, for example, the administrator or by the user). When this occurs the mobile syndication document is checked to verify if it has been updated since the time of the last push to a subscriber. If there has been an update the news aggregation service pushes the mobile syndication document to the subscriber's mobile device.

Once a subscriber's mobile device receives a new document pushed from the news aggregation service it displays a visual notification to alert the subscriber that updates have arrived.

With the above general embodiment in mind, the following description relates to a more detailed embodiment of the invention.

Selecting the Technology

As described above, the news aggregation service as a whole will generally be required to perform the following tasks:
- manage a list of subscribers and syndication services to which they have subscribed
- download and parse the syndication information (in this example, RSS/RDF pages)
- send a customized page (in this example, HTML) to the user using the mobile data service The news aggregation service includes a database, a user interface, and a news aggregation application for retrieving, parsing and pushing the syndication information. The database may be, for example, a MySQL™ database to store all of the user, server, site and subscription information. The user interface may make use of Apache™ and Php™ or similar products to create a web site where users can manage their subscriptions and add new RSS/RDF sites. Various development languages, such as Java™ (J2EE™), can be used to develop the news aggregation application to handle the retrieval, RSS/RDF parsing, subscriber custom page generation and pushing.

In a particular case, HTML or WML encoding can be used for sending the syndication information to the mobile device. These formats may allow an already existing web browser on the mobile device to be used to view the syndication information. Further, the amount of processing required on the mobile device is reduced by using a simpler format that may also use a smaller amount of data. Further, because the news aggregation application resides on the news aggregation server and performs the bulk of the activities, the processing load on the mobile device is reduced.

The Database Design

Figure 5:
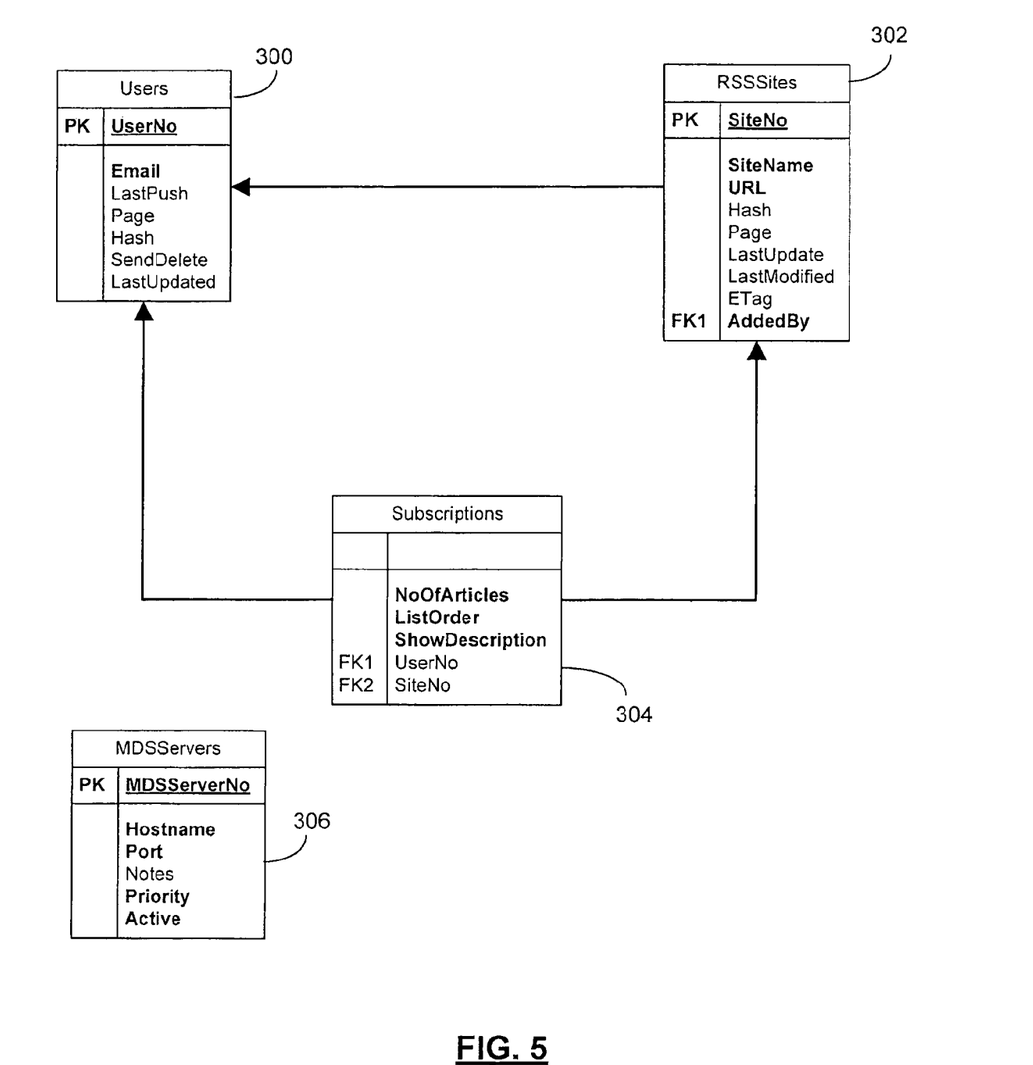
FIG. 5 illustrates example table structures for a database according to an embodiment of the invention.

FIG. 5 shows examples of the tables that can be used in the database. A first table 300 holds a list of users or subscribers to the news aggregation service. This first table 300 contains, for example, the following:
- a unique user number that uniquely identifies a user
- email address used to push the custom page to their mobile device
- time of the last successful push
- personalized custom page that is pushed to user
- hash of the custom page
- flag that is set when a user unsubscribes from the service
- timestamps of when the custom page was last updated A second table 302 holds information about the syndication servers (RSS/RDF sites) available. This second table 302 stores for example:
- a unique site number that uniquely identifies a syndication server
- the site name
- its URL
- hash of the RSS/RDF page
- a cache of the RSS/RDF page itself
- timestamp of when this page was last updated
- last modified date/time
- ETag header information from the web server that houses the RSS/RDF page
- user number of the user who added the site to the system The ETag (which is a representation of the current state of the syndication information, such as a hash value) and last modified HTTP header information from the last HTTP request are sent with every subsequent request to access the RSS/RDF page. This allows the web server to determine whether the page has been updated since last retrieval, and not to send the whole page every time (the syndication server can simply reply with a Not Modified: 304 code if there has been no update).

A third table 304 is used to store subscription information to know what syndication servers or web sites users would want pushed to their mobile device. The basic requirements of this third table 304 include, for example:
- the site number
- the user number of the subscriber Expanding on this, it is also preferable to include fields for storing user preference information about the syndication servers subscribed to:
- an integer field to store the maximum number of articles to return from the site. This is useful for sites that include a large number of headlines in their RSS/RDF page.
- an integer field to allow a subscriber to specify the order they wish their subscribed sites to appear in on their mobile device
- a flag that allows subscribers to select whether they want the article description to be sent along with the headline—for sites that include a description A fourth table 306 includes a list of mobile content servers that will be used to push data to the subscribers. The fourth table 306 includes, for example:
- a unique server number that uniquely identifies a mobile content server
- the hostname of the mobile content server
- the port of the mobile content server The fourth table 306 may also include fields for priority, whether active or not, and notes related to a particular mobile content server. The inclusion of the fourth table allows mobile content servers to be easily added and updated as the environment grows or changes.

The User Interface

In this embodiment, the user interface uses web-based technologies because almost every computer user is familiar with the web, and connecting via a web browser typically wouldn't require any additional software to be loaded on a subscriber's PC or mobile device. The user interface includes a main index HTML page and four PHP pages.

The main index HTML page prompts the user for their email address, and submits it to a main user interface page, after verifying that the user has entered a properly formatted email address. Most of the work of the user interface is done on the main user interface page.

Figure 6:
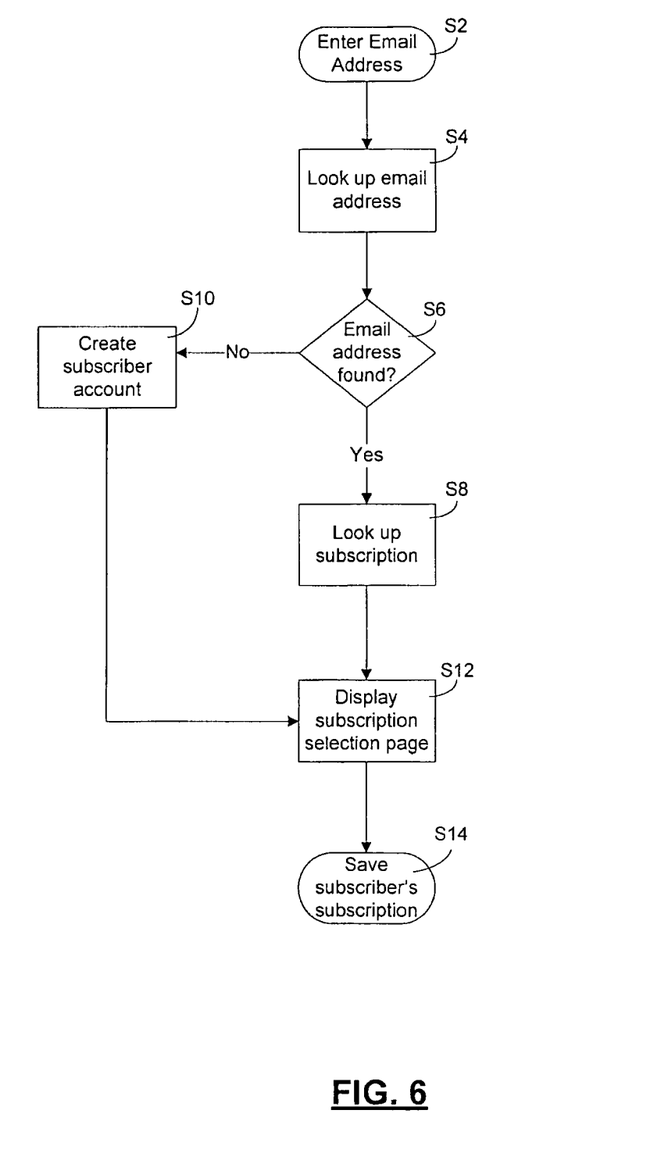
FIG. 6 is a flowchart showing the operation of a user interface for a news aggregation service according to an embodiment of the invention.

FIG. 6 is a flowchart showing the operation of the main user interface page. When the page is loaded, it receives the entered e-mail address (S2). The service then looks up the user e-mail (S4) and verifies whether the email address is already associated with a user entry in the user table (S6). If it is, the service looks up the user's subscription information (S8). If it is not, a new subscriber account is added (S10). Following either case, the service then provides a list of all syndication servers (RSS/RDF pages) that have been added to the news aggregation server and, where appropriate, indicates those RSS/RDF pages already subscribed to by the user (S12). This allows the user to manage subscriptions. From this page, the user can set the order in which the subscriptions will be received, the number of headlines to be shown for each syndication server, and whether or not the description will be shown with the headline if it is available. Users are also able to add additional RSS/RDF sites to the system from the page. Once a user has entered or adjusted subscriptions, the user's settings are saved (S14).

The remaining three PHP pages have auxiliary functions. An unsubscribe page is posted to from, and supplies the user number for a subscriber that is unsubscribing. The unsubscribing user is then removed from all entries of the subscriptions table, and a SendDelete flag in the users table is set to 1. A showpage page also accepts the user number as a parameter and will retrieve and display the user's customized HTML page from the user's table showing what will be sent to them via the channel push. This will allow the user to view and then customize the page that will be displayed on the mobile device. As will be understood by one of skill in the art, further functions may be provided to allow further customization of the user's custom page. The last php page, the header page, is included by the other pages and creates the connection to the database server.

The News Aggregation Application

The news aggregation application performs the tasks of:
  downloading the RSS/RDF pages
  parsing the RSS/RDF pages
  creating a customized HTML page based on a user's subscription
  pushing that page out to their user's mobile device through the mobile content server In this embodiment, using the Java programming language, four Java classes are used:
  a database connector
  an RSS/RDF XML parser
  a push class
  a main controlling class that ties it all together The database connector, RSSDBConnector, connects to the MySQL database server. Making a separate class for the database class is useful because, if there is a need to change the database server, a new database connector class can be created. In this particular embodiment, the MySQL Connector/J[6] JDBC driver is used when connecting to MySQL. The database connector class allows connections to be created and closed to MySQL, as well as executing a query passed to it. In this embodiment, there are two separate methods to handle queries, one for select statements that return a result set, and one for insert and update statements that return the number of rows affected by the query.

The parser, RSSParser, parses the RSS/RDF pages and breaks them apart, extracting the site name and titles, links and descriptions for each new article. The dom4j[7] framework was used to handle the XML. This class receives a string of XML and returns a vector containing the extracted information to be used in creating a subscriber's customized HTML page.

The push class, RSSPusher, handles the actual push of data to the mobile data service. In this embodiment, the push class is modeled after a known browser push application. Such an application is described in the Blackberry Application Developer Guide, Volume 1, Chapter 9: Creating client/server push applications, Research in Motion Limited, Waterloo, Canada, Nov. 24, 2004, http://www.blackberry.com/knowledgecenterpublic/livelink.exe?func=ll&objId=739500&objAction=browse&sort=name, which is hereby incorporated herein by reference. This push class allows the setting of all the parameters for a push of the syndication information from the news aggregation server to the specified mobile content server for delivery to the mobile device.

Figure 7:
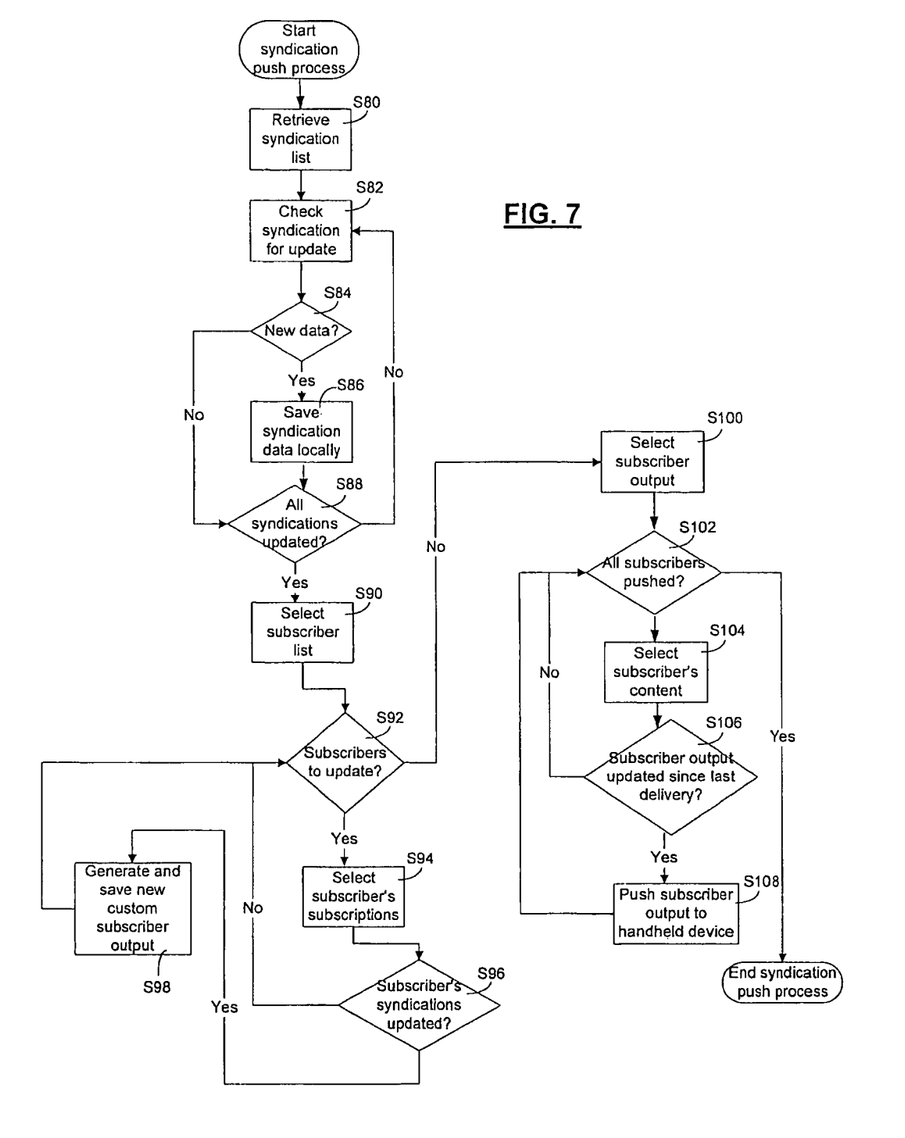
FIG. 7 is a flowchart showing the operation of a main controlling class for the news aggregation service according to an embodiment of the invention.

FIG. 7 is a flowchart showing operation of a main controlling class, RSSPush. RSSPush creates a connection to the MySQL database through RSSDBConnector and retrieves a listing of all RSS/RDF pages on the news aggregation service (S80). The first syndication server from the list is checked to see if it has been updated since the last check (S82) and (S84). If there is new data, the RSS/RDF page from the syndication server is updated in the database (S86). If there is no new data or following the saving of the updated data, the application then checks if all syndications have been updated (S88). If not, the application returns and checks the next syndication server in the list (S82). If all syndication servers have been updated, the subscriber list is retrieved (S90). The application then determines if there are subscribers to update (S92). The selection may be based, in part, on the subscriber's preferences with regard to how frequently they receive a push of updated syndication information. If there are subscribers to update, the application selects the subscriber's subscription information (S94) and determines if that subscriber's subscriptions have been updated (S96). If the subscriber's subscriptions or syndications have not been updated, the application returns to check the next subscriber in the list (S92). If the subscriber's syndications have been updated (S96), the application then generates and saves a new custom page for that subscriber (S98). When there are no further subscribers to update (no at S92), the application selects a list of subscribers that will be updated (S100). The application then determines if all subscribers have had their syndication information pushed to them or not (S102). If there are subscribers remaining (no at S102), the next subscriber's content is selected (S104) and it is determined if the subscriber's content has been updated since the last delivery (S106). If the subscriber's content has not been updated (no at S106), the application returns to check for the next subscriber (S102). If the subscriber's content has been updated since the last delivery (yes at S106), then the subscriber's content is pushed to their mobile device (S108). Following a push to a mobile device, the application returns to determine if there are further subscribers to have their syndication information pushed (S102). Once all subscribers have had their syndication information updated (yes at S102), the application then disconnects from MySQL and sleeps for a predetermined time, for example, 45 minutes before starting the process again. The predetermined time/interval may be set by a system administrator or, in an alternate embodiment, by an end user.

Since a browser channel push is used in this embodiment, a web browser such as those typically available on mobile devices handles rendering of the HTML page that is pushed out to the subscribers. Thus, there is no need for a new viewing application to reside on the mobile device.

After the push, it is necessary for the mobile device to provide notification to the user of new syndication information, for example, on the home screen. On some mobile devices, there are default icons available for channel pushes if an icon is not specified. If not, icons can be designed and provided by placing the icons on the news aggregation server and including links to them with the push itself. The icons show a change between two states; read and unread, depending on whether or not a new page has been pushed since the user last viewed it. Alternatively, the push may trigger another form of indication such as vibrating, flashing an indicator light, or the like.

It will be understood that the news aggregation service is pre-populated with data regarding the mobile content servers and ports of the mobile content servers for a given environment and may also be pre-populated with some RSS/RDF sites to attract subscribers. In this embodiment, as a matter of convenience, the news aggregation service runs as a Windows™ Service using the Java Service Wrapper, allowing it to run at startup without requiring someone logged into the computer.

Although embodiments of the invention have been described above with reference to syndication information, including titles and descriptions, in variant embodiments of the invention, the syndication information may include additional information such as author name, abstract of the news articles, date/time the article was created and/or updated, and the like.

It will be understood by persons skilled in the art that mobile content server 274 and news aggregation server 276 need not be implemented on a separate physical server in LAN 250 or other network. For example, some or all of the functions associated with the mobile content server 274 and news aggregation server 276 may be integrated with other servers in LAN 250. Furthermore, LAN 250 may comprise multiple mobile content servers 274 or news aggregation servers 276, particularly in variant implementations where a large number of mobile devices need to be supported. Still further, the news aggregation service may execute and reside on a computing device or computing devices separate from the LAN 250.

Although embodiments of the invention have been described in which the polling of syndication servers and the push to subscribers are conducted at separate intervals, it will be understood that other combinations are also possible. Further, the timing of the polling of the syndication servers should generally be adjusted and controlled such that it does not place an undue processing or bandwidth burden on the syndication servers.

It will be further understood that the method of processing syndication information for a mobile device in embodiments of the invention may be implemented as executable software instructions stored on computer-readable media, which may be executed in a computer.

The invention has been described with regard to a number of embodiments. However, it will be understood by persons skilled in the art that other variants and modifications may be made without departing from the scope of the invention as defined in the claims appended hereto.

We claim:

1. A method on a news aggregation server for providing syndicated news articles to a mobile device, said method comprising:
    said news aggregation server periodically polling a plurality of XML news syndication servers, at a server configured periodic interval, to obtain updated news articles from each of said plurality of XML news syndication servers;
    said news aggregation server receiving subscription information associated with the mobile device, the subscription information:
        identifying at least one subscriber-specified XML news syndication server from the plurality of XML news syndication servers,
        indicating a subscriber-specified maximum number of updated news articles for each of the at least one subscriber-specified XML news syndication server, wherein said XML news syndication server is a server that performs formatting of news syndication information into an XML format, wherein the news syndication information is to be displayed on the mobile device, and
        indicating a subscriber-specified periodic interval for how frequently to send updated news articles to the mobile device;
    said news aggregation server determining, based on the subscription information, an aggregated list of updated news articles from the at least one subscriber-specified XML news syndication server, the aggregated list of updated news articles comprises up to the subscriber-specified maximum number of updated news articles that have not been previously sent to the mobile device;
    said news aggregation server generating, based on the aggregated list of updated news articles, a mobile syndication document in a predetermined format optimized for wireless delivery to the mobile device, the mobile syndication document comprising at least a title and a news portion extracted from each updated news article in the aggregated list of updated news articles; and
    said news aggregation server sending the mobile syndication document to the mobile device via a wireless communication network at the subscriber-specified periodic interval.

2. A method on a news aggregation server, said method comprising:
    said news aggregation server maintaining a syndication server listing that identifies a plurality of XML news syndication servers;
    said news aggregation server receiving and storing subscription information for a corresponding mobile device, the subscription information:
        identifying at least one subscriber-specified XML news syndication server from the plurality of XML news syndication servers,
        indicating a subscriber-specified maximum number of updated news articles for each of the at least one subscriber-specified XML news syndication server, wherein said XML news syndication server is a server that performs formatting of news syndication information into an XML format, wherein the news syndication information is to be displayed on the mobile device, and
        indicating a subscriber-specified periodic interval for how frequently to send updated news articles to the corresponding mobile device;
    said news aggregation server polling each XML news syndication server identified in the syndication server listing at a server-configured periodic polling interval associated with each syndication server, said polling to obtain updated syndication information from each XML news syndication server;
    said news aggregation server aggregating updated syndication information from said plurality of XML news syndication servers to prepare an aggregated set list of up to the subscriber-specified maximum number of updated news articles from the at least one subscriber-specified XML news syndication server based on the subscription information for the corresponding mobile device;
    said news aggregation server generating a mobile syndication document with the aggregated list of updated news articles adapted into a predetermined format optimized for wireless delivery; and
    said news aggregation server sending the mobile syndication document from the news aggregation server to the corresponding mobile device via a wireless communication network at the subscriber-specified periodic interval if the at least one subscriber-specified XML news syndication server has been updated since a previous mobile syndication document was sent to the corresponding mobile device.

3. The method of claim 2, further comprising: said news aggregation server parsing the updated syndication information to obtain headlines and descriptions of updated news articles.

4. The method of claim 2, wherein said mobile syndication document includes a title and a news article description for one of the updated news articles.

5. The method of claim 2, wherein said predetermined format is HTML format.

6. The method of claim 2, wherein the server-configured periodic polling interval is set by a system administrator.

* * * * *